July 22, 1952     A. L. SHAW     2,603,873
GLASS CUTTING GAUGE
Filed Aug. 11, 1949

Inventor
Albert Lemuel Shaw

Patented July 22, 1952

UNITED STATES PATENT OFFICE 2,603,873

2,603,873

GLASS CUTTING GAUGE

Albert Lemuel Shaw, Corinne, Utah

Application August 11, 1949, Serial No. 109,705

1 Claim. (Cl. 33—42)

The present invention relates to new and useful improvements in glass cutters and more particularly to an improved gauge attachment for the cutter.

An important object of the invention is to provide an easily attachable gauge which may be secured in position to the stock of a glass cutter to hold the cutter traveling along a straight line while cutting a sheet of glass to a desired width.

A further object is to provide an adjustable gauge carried by a graduated bar for measuring the width of the glass to be cut.

Another object is to provide a gauge block for sliding along the edge of the glass and which is on a graduated bar, by means of which a cutter rigidly attached to the bar may swing vertically during its cutting movement without disturbing the position of the gauge block on the glass.

A still further object is to provide a tool of this character of simple and practical construction which is efficient and reliable in operation, relatively inexpensive to manufacture and otherwise well adapted for the purposes for which the same is intended.

Other objects and advantages reside in the details of construction and operation as more fully hereinafter described and claimed, references being had to the accompanying drawing forming part hereof, wherein like numerals refer to like parts throughout, and in which:

Figure 1:
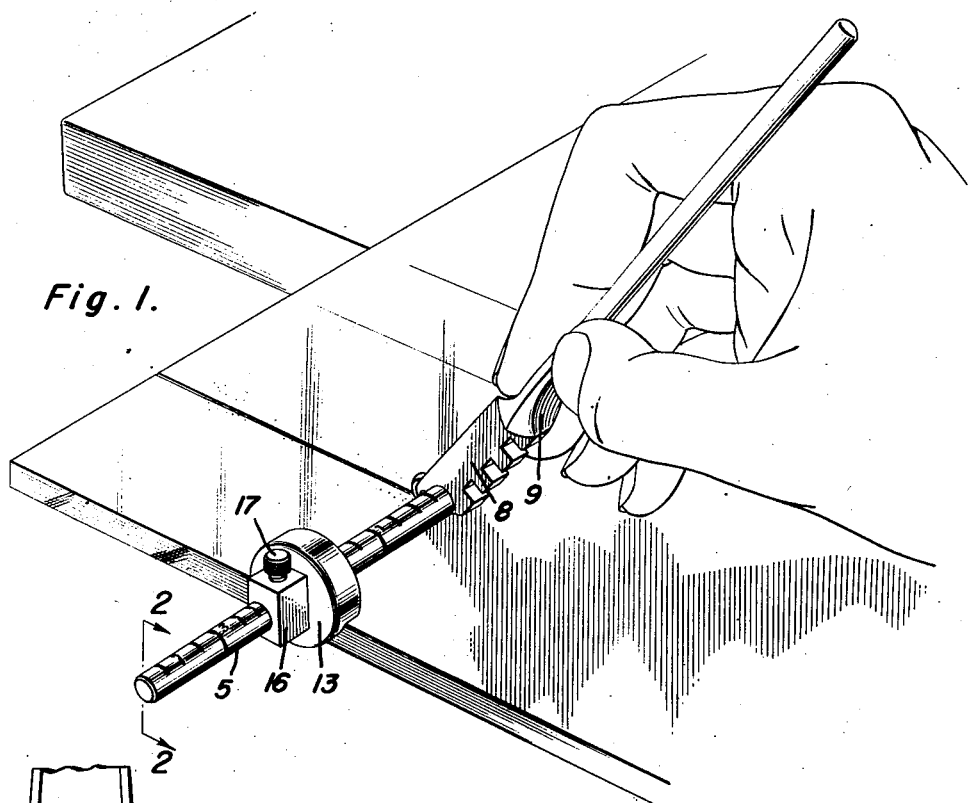
Figure 1 is a perspective view.
Figure 2:
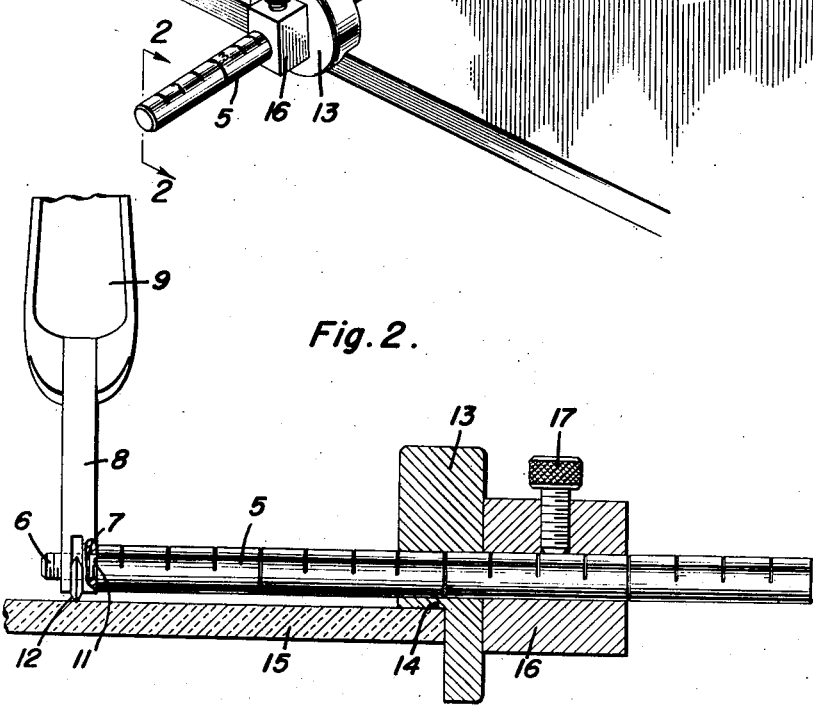
Figure 2 is an enlarged longitudinal sectional view of the gauge.

Referring now to the drawing in detail wherein for the purpose of illustration I have disclosed a preferred embodiment of my invention, the numeral 5 designates a round gauge bar having a reduced threaded end 6 for threading into an opening 7 formed transversely on the sides of the stock 8 of a glass cutter 9. Bar 5 is graduated in inches and fractions thereof as shown at 10 from the shoulder 11 defined by the reduced end 6 and which abuts the side of the cutter stock, the graduations including in its measurement the distance between the cutting wheel 12 and the shoulder.

A circular gauge block 13 is freely slidable and rotatable on bar 5. The inner edge of the block being rabbeted to form a shoulder 14 which rests on the edge of a sheet of glass 15 to support bar 5 in a horizontal position above the surface of the glass where cutter 12 rests thereon, the lower edge of the gauge block below the shoulder bearing against the edge of the glass.

A stop block 16 is also slidably mounted on bar 5 outwardly of gauge block 13 and is held in adjusted position by a set screw 17.

In the operation of the device bar 5 is threaded into one side of stock 8 of a glass cutter and gauge block 13 and stop block 16 are adjusted on bar 5 to the desired width of glass to be cut and shoulder 14 of the gauge block placed on the edge of the glass to slide thereon with the cutter as it is drawn along the surface of the glass in the usual manner to cut the glass. Block 13 may be reversed when cutting narrow margins.

The lower edge of the gauge block bears against the edge of the glass to prevent twisting of the bar 5 from its right angle position to the edge of the glass to insure cutting the glass at a uniform width, while the bar 5 is free to rotate in the gauge block to compensate for the wrist action of the hand of a person while using the cutter.

In view of the foregoing description taken in conjunction with the accompanying drawing it is believed that a clear understanding of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim. As a rabbet of block 13 is of a definite width, the inner side of this block may be set short the distance of such width so that the glass will be cut at the proper place.

Having described the invention what is claimed as new is:

In combination, a glass cutter including a stock, a gauge bar carried by and extending laterally from one side of said stock, a gauge block carried by said bar and having a bottom rabbet in one side thereof fitting the edge of work to guide the cutter parallel with said edge, said rabbet fitting against the edge of the work and forming an elongated flat shoulder for sliding on top of the work along said edge to hold said block against turning, said bar being rotatable in said block to provide for swinging of said stock during cutting, said gauge block being slidable along said bar to gauge the distance of the cut from said edge of the work, and a flat sided abutment block on said gauge bar settable along the same into flat engagement with the other side of the gauge block to variably limit sliding of the gauge block along said bar.

ALBERT LEMUEL SHAW.

REFERENCES CITED

The following references are of record in the file of this patent:

UNITED STATES PATENTS

| Number | Name | Date |
|---|---|---|
| 207,809 | Heyn | Sept. 10, 1878 |
| 672,312 | Cook | Apr. 16, 1901 |
| 1,031,183 | Hollingsworth | July 2, 1912 |
| 1,750,913 | Vollm | Mar. 18, 1930 |
| 2,243,778 | Stansel | May 27, 1941 |

FOREIGN PATENTS

| Number | Country | Date |
|---|---|---|
| 26,258 | Austria | Nov. 10, 1906 |
| 30,896 | Austria | Jan. 15, 1907 |